(12) United States Patent
Accapadi et al.

(10) Patent No.: US 10,019,392 B2
(45) Date of Patent: *Jul. 10, 2018

(54) PREVENTING SOFTWARE THREAD BLOCKING DUE TO INTERRUPTS

(71) Applicant: International Business Machines Corporation, Armonk, NY (US)

(72) Inventors: Mathew Accapadi, Cedar Park, TX (US); Grover C. Davidson, II, Round Rock, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/737,359

(22) Filed: Jun. 11, 2015

(65) Prior Publication Data

US 2016/0275025 A1  Sep. 22, 2016

Related U.S. Application Data

(63) Continuation of application No. 14/663,657, filed on Mar. 20, 2015.

(51) Int. Cl.
*G06F 13/24* (2006.01)
*G06F 9/48* (2006.01)

(52) U.S. Cl.
CPC ............ *G06F 13/24* (2013.01); *G06F 9/4881* (2013.01)

(58) Field of Classification Search
CPC ............................. G06F 13/24; G06F 9/4881
See application file for complete search history.

(56) References Cited

U.S. PATENT DOCUMENTS

| 5,974,440 | A | * | 10/1999 | Brooks ................. G06F 9/4812 |
| | | | | 710/262 |
| 7,047,321 | B1 | | 5/2006 | Endo |
| 7,222,203 | B2 | | 5/2007 | Madukkarumukumana et al. |
| 8,086,910 | B1 | | 12/2011 | Koktan et al. |

(Continued)

OTHER PUBLICATIONS

Accapadi et al., "Preventing Software Thread Blocking Due to Interrupts," Filed on Mar. 20, 2015, p. 1-32, U.S. Appl. No. 14/663,657.

(Continued)

*Primary Examiner* — Jing-Yih Shyu
(74) *Attorney, Agent, or Firm* — Robert C. Bunker

(57) ABSTRACT

According to one exemplary embodiment, a method for preventing a software thread from being blocked due to processing an external device interrupt is provided. The method may include receiving the software thread, whereby the software thread has an associated interrupt avoidance variable. The method may also include determining a processor to receive the software thread. The method may then include sending the software thread to the determined processor. The method may further include setting an interrupt mask bit associated with the processor based on the interrupt avoidance variable. The method may also include receiving the external device interrupt. The method may then include redirecting the received external device interrupt to a second processor, whereby the redirecting is based on the interrupt mask bit.

5 Claims, 6 Drawing Sheets

(56) References Cited

U.S. PATENT DOCUMENTS

| | | | |
|---|---|---|---|
| 8,196,140 B2* | 6/2012 | Miskelly | G06F 9/485 |
| | | | 717/125 |
| 8,612,659 B1* | 12/2013 | Serebrin | G06F 13/24 |
| | | | 710/262 |
| 9,026,705 B2 | 5/2015 | Feehrer et al. | |
| 9,507,602 B2 | 11/2016 | Alexander et al. | |
| 2005/0125580 A1* | 6/2005 | Madukkarumukumana | |
| | | | G06F 9/4812 |
| | | | 710/200 |
| 2006/0037020 A1* | 2/2006 | Accapadi | G06F 9/5027 |
| | | | 718/102 |
| 2007/0038818 A1* | 2/2007 | Greenfield | G06F 13/24 |
| | | | 711/152 |
| 2013/0179616 A1* | 7/2013 | Accapadi | G06F 9/4812 |
| | | | 710/269 |
| 2013/0179619 A1 | 7/2013 | Whetsel | |
| 2016/0275024 A1 | 9/2016 | Accapadi et al. | |

OTHER PUBLICATIONS

Evelyn et al., "Problems in Interrupt-Driven Software," Stack Overflow, Interrupt Overload Presentation, Penn Engineering Fall 2006, http://www.cis.upenn.edu/~lee/06cse480/lec-emsoft-analysis-p1.pdf, Accessed on Mar. 13, 2015.

Hansen et al., "A Scheduling Scheme for Network Saturated NT Multiprocessors," Department of Computer Science, University of Copenhagen (DIKU), p. 1-11, http://www.diku.dk/~cyller/ntws/hansen.html, Accessed on Mar. 13, 2015.

Mell et al., "The NIST Definition of Cloud Computing," National Institute of Standards and Technology, Information Technology Laboratory, Oct. 7, 2009, Version 15.

Regehr et al., "Preventing Interrupt Overload," LCTES'05, Jun. 15-17, 2005, p. 1-9, ACM, Chicago, Illinois, USA.

IBM, "List of IBM Patents or Patent Applications Treated as Related (Appendix P)," Jun. 12, 2015, p. 1-2.

* cited by examiner

PREVENTING SOFTWARE THREAD BLOCKING DUE TO INTERRUPTS

BACKGROUND

The present invention relates generally to the field of computing, and more particularly to interrupt handling.

Software is often processed as one or more threads by a CPU. Threads that are processed by the CPU may be interrupted for other processes that require CPU resources, such as a network packet arriving at a communications adapter. A CPU may be interrupted by a hardware interrupt that is raised. As such, the CPU may be caused to suspend execution of the thread to process the hardware interrupt.

SUMMARY

According to one exemplary embodiment, a method for preventing a software thread from being blocked due to processing an external device interrupt is provided. The method may include receiving the software thread, whereby the software thread has an associated interrupt avoidance variable. The method may also include determining a processor to receive the software thread. The method may then include sending the software thread to the determined processor. The method may further include setting an interrupt mask bit associated with the processor based on the interrupt avoidance variable. The method may also include receiving the external device interrupt. The method may then include redirecting the received external device interrupt to a second processor, whereby the redirecting is based on the interrupt mask bit.

According to another exemplary embodiment, a computer system for preventing a software thread from being blocked due to processing an external device interrupt is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the software thread, whereby the software thread has an associated interrupt avoidance variable. The method may also include determining a processor to receive the software thread. The method may then include sending the software thread to the determined processor. The method may further include setting an interrupt mask bit associated with the processor based on the interrupt avoidance variable. The method may also include receiving the external device interrupt. The method may then include redirecting the received external device interrupt to a second processor, whereby the redirecting is based on the interrupt mask bit.

According to yet another exemplary embodiment, a computer program product for preventing a software thread from being blocked due to processing an external device interrupt is provided. The computer program product may include one or more computer-readable storage devices and program instructions stored on at least one of the one or more tangible storage devices, the program instructions executable by a processor. The computer program product may include program instructions to receive the software thread, whereby the software thread has an associated interrupt avoidance variable. The computer program product may also include program instructions to determine a processor to receive the software thread. The computer program product may then include program instructions to send the software thread to the determined processor. The computer program product may further include program instructions to set an interrupt mask bit associated with the processor based on the interrupt avoidance variable. The computer program product may include also program instructions to receive the external device interrupt. The computer program product may then include program instructions to redirect the received external device interrupt to a second processor, whereby the redirecting is based on the interrupt mask bit.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
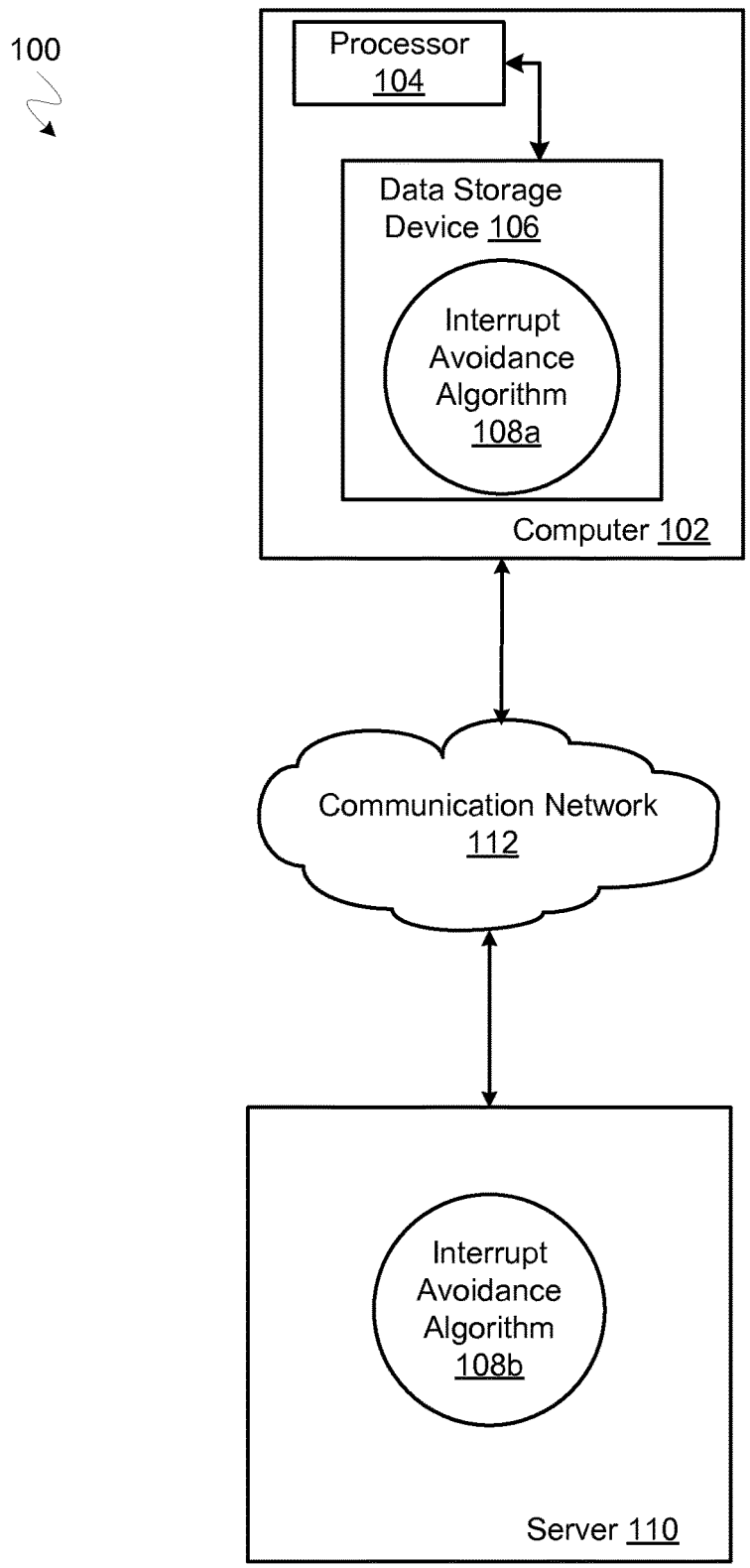
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for preventing software thread interruption due to external device interrupt processing. As such, the present embodiment has the capacity to improve the technical field of thread processing by providing a way to prevent a software thread from being blocked due to external device interrupt processing. More specifically, the present embodiment may use a variable associated with a software thread to indicate that the CPU running the software thread may not be interrupted while executing the software thread. Once the software thread relinquishes execution on the CPU, the CPUs default interrupt behavior may resume. Therefore, allowance of external device interrupts may be dynamically controlled with respect to individual CPUs.

As described previously, CPU resources may be assigned to threads that the CPU executes. Current CPU architecture provides for interrupts that may cause the CPU to suspend current thread processing in order to process hardware interrupts.

For example, if network packets containing data arrive at a communications adapter (e.g., Ethernet adapter) connected to an electronic device (e.g., server, computer, etc.), a hardware interrupt will be generated to interrupt the CPU. If a software thread is running on the CPU, the software thread will be interrupted and will be suspended while the hardware interrupt is processed. The CPU will then proceed to execute network code that will process the packets while the software thread remains suspended or blocked by interrupt processing. If more packets continue to arrive, the CPU may continue to process the packets and the software thread will remain suspended or blocked by the interrupt processing. Blocking software threads in this manner may have negative consequences for software threads that need real-time processing (e.g., stock trading software, etc.).

Additionally, the software thread that is interrupted may also be the software thread that was meant to receive the incoming network packets. In this case, if the software thread is suspended and cannot read the network socket assigned to the software thread and the incoming packets (and thus release the network buffers used to store the incoming packets), then the adapter's device driver will not be able to re-use the current buffers. This may lead to new buffers being allocated that may slow down processing and potentially cause network packet drops or slowdowns.

The software thread that is receiving the incoming packets may also be made runnable to a CPU while the software thread is not currently running and the CPU is busy processing incoming packets. If there are a large amount of packets continually arriving, the CPU may stay in interrupt mode for an extended period of time, thus preventing the software thread from running.

Therefore, it may be advantageous to, among other things, provide a way to prevent software thread interruption by a device interrupt or allow the software thread to be dispatched to a different CPU if the target CPU is busy processing interrupts.

Some application processes, or individual threads associated with an application process, may need real-time response and therefore must not be interrupted from execution. For example, stock trading software or software running radar detection.

According to at least one embodiment, a mask bit setting may be used to dynamically set and unset the mask bit for a specific software thread when the software thread is dispatched (i.e. assigned and sent) to a CPU.

Additionally, software threads may have an environment variable set that indicates that the software thread should not be interrupted by external device interrupts. The interrupt avoidance algorithm may also determine if the software thread owner's user identification (user ID) has the necessary privileges assigned to the user ID by an administrator to stop interrupts. Checking if the user ID's privilege level exceeds a predetermined privilege threshold value may be used to maintain control of interrupt avoidance and ensure that enough CPUs are free to handle interrupts that need to be processed.

When the software thread is dispatched by the kernel dispatcher, the kernel dispatcher code may set an interrupt mask bit that tells the interrupt presentation layer to not present an interrupt to the CPU that the software thread will be dispatched to. The mask bit may be set on the CPU and may be immediately followed by the context switch to dispatch the thread. When the software thread is about to be undispatched (e.g., end of time slice event, preemption event, voluntary or involuntary sleep event, etc.), the kernel dispatcher code may unset the interrupt masking bit for that CPU immediately before (or after) the thread has been undispatched.

According to at least one embodiment, software threads may also be prevented from being interrupted when the CPU that the software thread is made runnable to is busy processing external interrupts. As described previously, the software thread may have an environment variable set and the interrupt avoidance algorithm may determine if the software thread owner's user ID has the necessary privileges assigned to the user ID by an administrator to stop interrupts on the CPU executing the software thread.

If a software thread is prevented from running on the CPU the software thread is runnable to, due to the CPU processing interrupts, the interrupt state may prevent the dispatch of the software thread to the CPU. By default, the software thread stays runnable to the CPU the thread was dispatched to (since the CPU is running the idle thread) even though interrupt processing is occurring. An existing global tunable parameter may indicate that if an idle CPU is in an interrupt state, the software thread may be dispatched to another CPU. This approach may have negative performance impacts since the interrupting process may not take much time to complete and thus the time and resources taken to redispatch a software thread may exceed the time taken to wait for the interrupt processing to complete.

Software threads may avoid being blocked when the target CPU (i.e., the CPU the software thread is runnable to) is busy processing external interrupts by restricting the capability to redispatch the thread to another CPU to the specific thread that has the environmental variable set (i.e., indicating that thread is not interruptible). According to at least one other embodiment, a new tunable parameter can be implemented that may indicate that if the thread has been waiting a predefined amount of time, the thread will be dispatched to some other CPU that is not currently processing interrupts.

Referring now to FIG. 1, an exemplary networked computer environment 100 in accordance with one embodiment is depicted. The networked computer environment 100 may include a computer 102 with a processor 104 and a data storage device 106 that is enabled to run an interrupt avoidance algorithm 108a. The networked computer environment 100 may also include a server 110 that is enabled to run an interrupt avoidance algorithm 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 4, server computer 110 may include internal components 902a and external components 904a, respectively, and client computer 102 may include internal components 902b and external components 904b, respectively. Client computer 102 may be, for example, a mobile device, a telephone, a PDA, a netbook, a laptop computer, a tablet computer, a desktop computer, or any type of computing device capable of running a program and accessing a network.

A program, such as an interrupt avoidance algorithm 108a and 108b may run on the client computer 102 or on the server computer 110. The interrupt avoidance algorithm 108a and 108b may be used to prevent software threads from being blocked due to external device interrupt processing. The interrupt avoidance algorithm 108a and 108b is explained in further detail below with respect to FIGS. 2 and 3.

Figure 2:
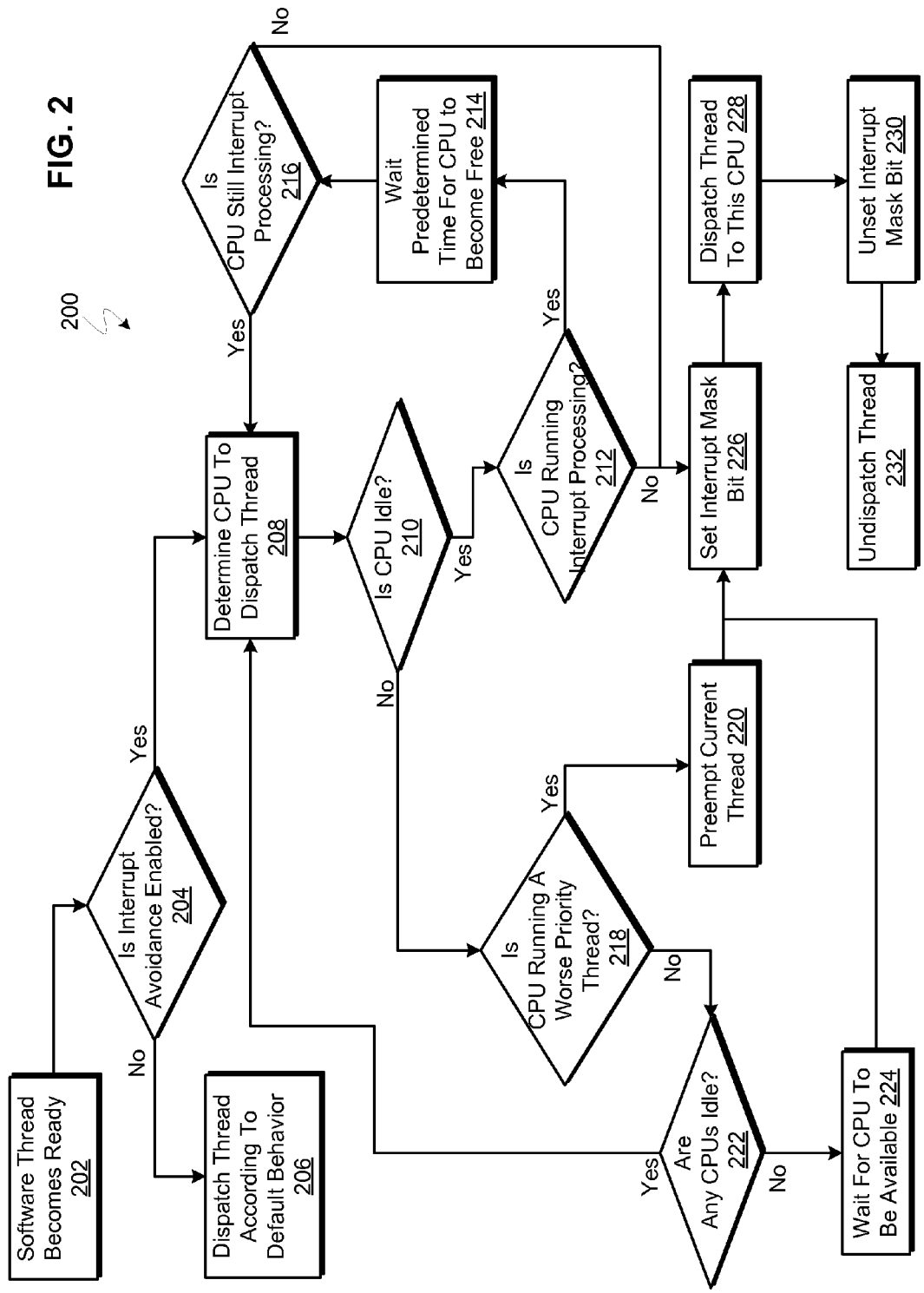
FIG. 2 is an operational flow chart illustrating software steps for interrupt avoidance according to at least one embodiment.

Referring now to FIG. 2, an operational flow chart 200 illustrating the software steps carried out by an algorithm for interrupt avoidance according to at least one embodiment is depicted.

At 202, a software thread may become ready for execution by a CPU. For example, the software thread may have been in a sleep state, waiting for a packet to be received from over a network, for certain input/output (I/O) operations to occur, etc. The software thread that may have given up the CPU previously, may transition to a runnable state (e.g., the packet the software thread was waiting on arrived) whereby the software thread has become runnable.

Next, at 204, it may be determined if the readied software thread has the interrupt avoidance feature enabled. The operating system kernel may check a data structure associated with the software thread or the application process that the software threads belong to for a relevant environment variable (e.g., a flag variable indicating whether the interrupt avoidance feature is enabled for the software threads associated with the application process) in response to a system call (e.g., getenv( )).

According to at least one embodiment, a system call (e.g., getenv( )) may be invoked to obtain the environment variable from the kernel, indicating if the application process is utilizing the interrupt avoidance feature. The environment variable may be stored in a data structure associated with the application process. Additionally, the environment variable may be set in a variety of ways. For example, an administrator may set the environment variable, or code within the application process may make system calls to the kernel to set the environment variable automatically.

According to at least one other embodiment, the software thread may use a system call to the kernel earlier in execution to set the environment variable (e.g., flag) indicating that the software thread is utilizing the interrupt avoidance feature. In response, the kernel may create and configure the environment variable (e.g., flag) in a data structure associated with the software thread. Therefore, individual software threads may control if the software thread is utilizing the interrupt avoidance feature.

Thus, interrupt avoidance may be implemented at the application process level (i.e., all threads associated with the application process would utilize the interrupt avoidance feature) or interrupt avoidance may be implemented at the software thread level (i.e., only certain threads associated with an application process would utilize the interrupt avoidance feature).

Additionally, security privileges may be checked and enforced. According to at least one embodiment, the privilege level assigned to the user identification (user ID) associated with the application process may be checked. If the user ID for the application process does not have a sufficient privilege level (i.e., the privilege level associated with the user ID does not exceed a threshold value), the software thread may not be allowed to utilize the interrupt avoidance feature despite what the environment variable is set to. Thus, administrators or other entities may control how many software threads may employ the interrupt avoidance feature to preserve system efficiency.

If, at 204, it was determined that the software thread does not have the interrupt avoidance feature enabled (e.g., the environment variable was set to indicate that the software thread is not utilizing the interrupt avoidance feature or if the environment variable is not present in the data structure associated with the software thread), the software thread may be dispatched to a CPU according to the default behavior by the kernel at 206.

However, if it was determined that the software thread does have the interrupt avoidance feature enabled at 204, the CPU to dispatch the software thread to may be determined at 208. According to at least one embodiment, the kernel is used to determine what CPU the software thread should be dispatched to. For example, a software thread that was executing on a CPU previously and entered a sleep state while waiting for a network packet to arrive may become ready once the packet arrives. The kernel may then determine that the CPU the software thread ran on previously should be the CPU the software thread should be dispatched to. The kernel may also determine to dispatch the software thread to another CPU in different circumstances.

Next, at 210, it may be determined if the target CPU the software thread is dispatched to is currently in an idle state. According to at least one embodiment, the CPU may be determined to be idle if the target CPU is currently running the kernel idle thread.

If it was determined that the target CPU is idle at 210, it may then be determined if the target CPU may be running interrupt processing at 212. According to at least one embodiment, a data field in a data structure associated with the target CPU may be checked to determine if the data field indicates if the CPU is in an interrupt mode (i.e., processing interrupts).

If it is determined that the target CPU is running interrupt processing at 212, a predetermined amount of time to wait for the target CPU to become free may be allowed to pass at 214. In some situations, a CPU that is interrupt processing may only be processing the interrupt for a short amount of time. Redispatching a software thread to a different CPU in that situation may be more inefficient than waiting the short amount of time necessary for the CPU to finish interrupt processing. According to at least one embodiment, the predetermined amount time to wait for the target CPU to finish interrupt processing may be allowed to pass before returning to 208 to have another target CPU determined. The predetermined amount of time may be implemented as a tunable parameter in the kernel indicating the amount of time to wait (e.g., as CPU cycles, nanoseconds, microseconds, etc.). The amount of time to wait may be set, for example, to time periods that coincide with the average amount of time needed to process one interrupt by the CPU. The kernel tunable parameter may be set by the administrator, or an environment variable set by the administrator or application owner. Additionally, the kernel tunable parameter may take precedence over an environment variable, if present. The kernel tunable parameter could have a value (e.g., −1) that also indicates that the environment variable may freely determine the amount of time to wait.

Once the predetermined amount of time elapses at 214, it may be determined if the target CPU is still interrupt processing at 216. If the target CPU is still interrupt processing at 216, execution may return to step 208 to have a new target CPU determined for the software thread.

If it is determined that the target CPU is not idle at 210, it may be determined if the target CPU is currently processing a thread having a worse priority than the readied software thread at 218. If it is determined that the target CPU is running a thread with a worse priority at 218, the current thread running on the target CPU may be preempted by the readied software thread at the next available opportunity (e.g., when an interrupt occurs on the target CPU) at 220.

However, if the thread currently running on the target CPU has an equal or better priority than the readied thread, it may be determined if any other CPUs are idle at 222. According to at least one embodiment, it may be determined if other CPUs are idle by checking if a CPU is running the kernel idle thread. If it is determined that there are idle CPUs at 222, execution would return to step 208 to determine a CPU to dispatch the software thread. However, if it is determined that there may not be any idle CPUs at 222, a predetermined amount of time to wait for a CPU to become available may be allowed to pass at 224. For example, the CPU may become available when an interrupt occurs on a CPU and the kernel checks if there is a thread with a better priority available to run according to existing kernel behavior.

Next, at 226, if it is determined that the CPU is no longer interrupt processing at 216, if it is determined that the target CPU was idle and not interrupt processing at 212, if the current thread was preempted at 220, or if the CPU became available at 224, an interrupt mask bit may be set. According to at least one embodiment, the interrupt mask bit for the target CPU may be set by setting a register associated with the target CPU that is designated to indicate the interrupt mask. The interrupt mask bit indicates to the hardware that no interrupts should be sent to the target CPU.

Then, at 228 the software thread may be dispatched to the target CPU for execution. Once the thread has finished executing (e.g., the thread has used up the time slice and another thread with the same or better priority needs to run, the thread wants to enter a sleep state to wait for a packet, or the thread otherwise relinquishes execution) and the thread needs to be undispatched, the interrupt mask bit associated with the target CPU may be unset at 230. Next, at 232, the software thread may be taken off of the target CPU and undispatched.

Figure 3:
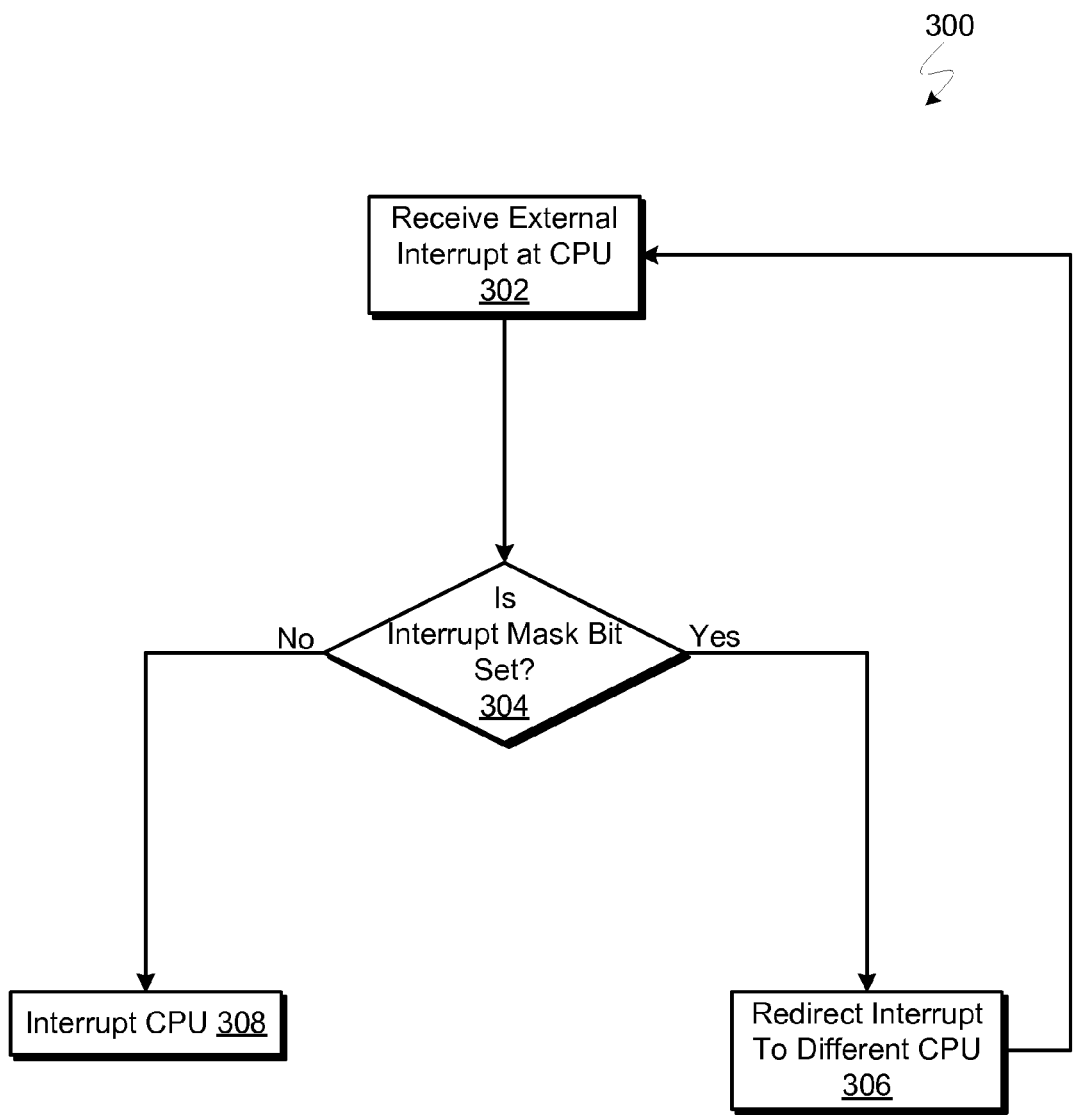
FIG. 3 is an operational flow chart illustrating a hardware interrupt distribution algorithm according to at least one embodiment.

Referring now to FIG. 3, an operational flow chart 300 illustrating the steps carried out by an algorithm for hardware interrupt distribution according to at least one embodiment is depicted.

At 302 an external interrupt may be received at the CPU. For example, a network adapter's device driver may generate an interrupt request that is received by the CPU in response to the network adapter receiving a network packet.

Next, at 304, it may be determined if the interrupt mask bit associated with the CPU is set (i.e., the interrupt mask bit indicates that the CPU may not be interrupted while processing the current thread). According to at least one embodiment, the interrupt mask bit may correspond to a register associated with the CPU. The CPU's mask bit may be read by an interrupt presentation layer and the interrupt presentation layer may provide the mask bit status.

If it was determined that the interrupt mask bit for the CPU has been set at 304, the interrupt may be directed to another CPU at 306. For example, if the current CPU is processing a software thread and the interrupt mask bit is set and an interrupt from a network adapter is received by the current CPU, the interrupt will be redirected to a different CPU (e.g., by a hypervisor) to process. Thus, the current CPU may be allowed to continue processing the software thread uninterrupted. Afterward redirecting the interrupt, the current CPU may handle any future interrupt requests at step 302.

However, if it is determined that the interrupt mask bit is not set at 304, the CPU may be interrupted according to existing interrupt behavior at 308.

It may be appreciated that FIGS. 2 and 3 provide only an illustration of one embodiment and does not imply any limitations with regard to how different embodiments may be implemented. Many modifications to the depicted embodiment(s) may be made based on design and implementation requirements.

Figure 4:
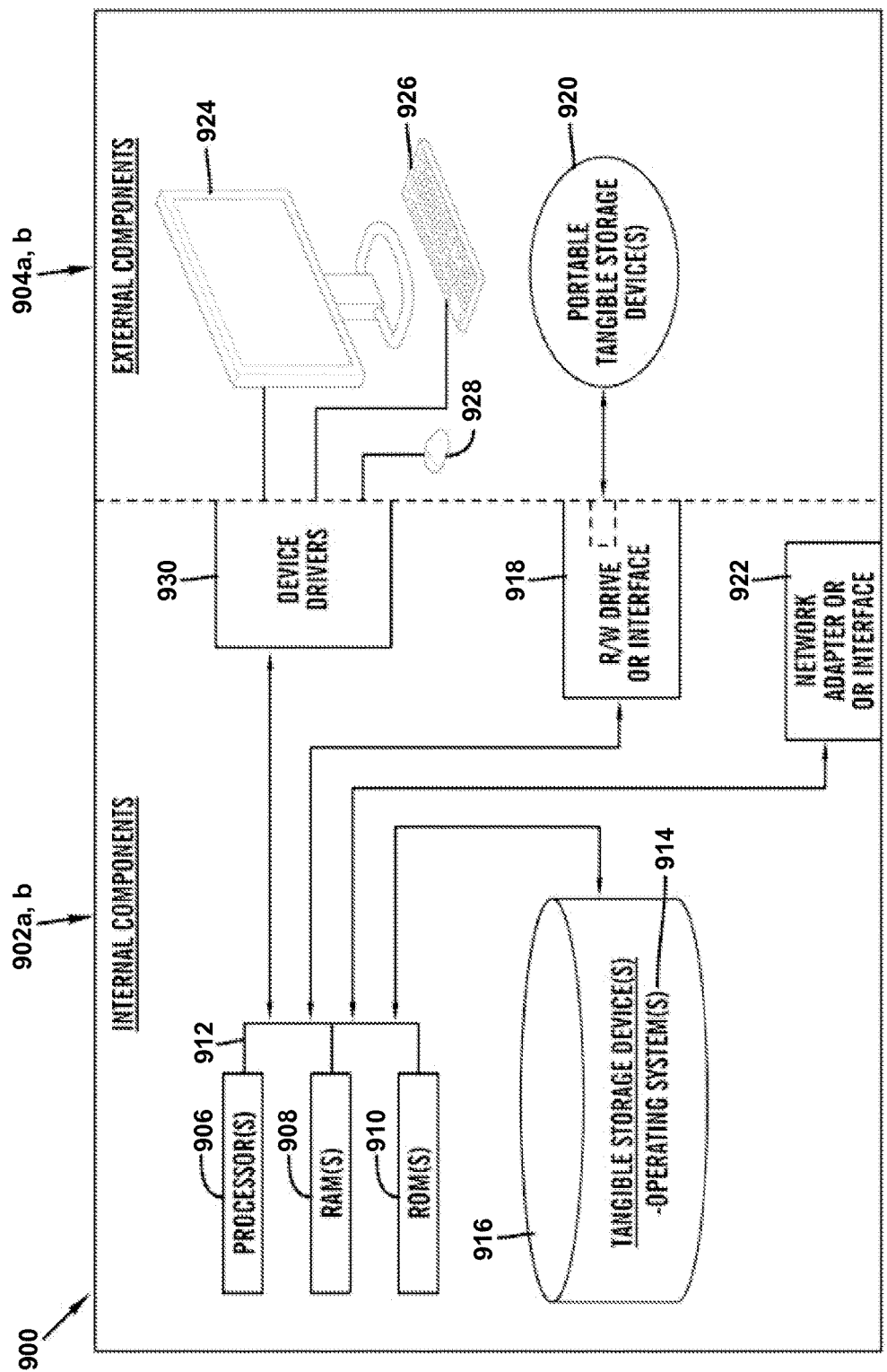
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and programs such as an interrupt avoidance algorithm 108a and 108b (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. The interrupt avoidance algorithm 108a and 108b (FIG. 1) can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The interrupt avoidance algorithm 108a (FIG. 1) in client computer 102 (FIG. 1) and the interrupt avoidance algorithm 108b (FIG. 1) in network server computer 110 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the interrupt avoidance algorithm 108a (FIG. 1) in client computer 102 (FIG. 1) and the interrupt avoidance algorithm 108b (FIG. 1) in network server computer 110 (FIG. 1) are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
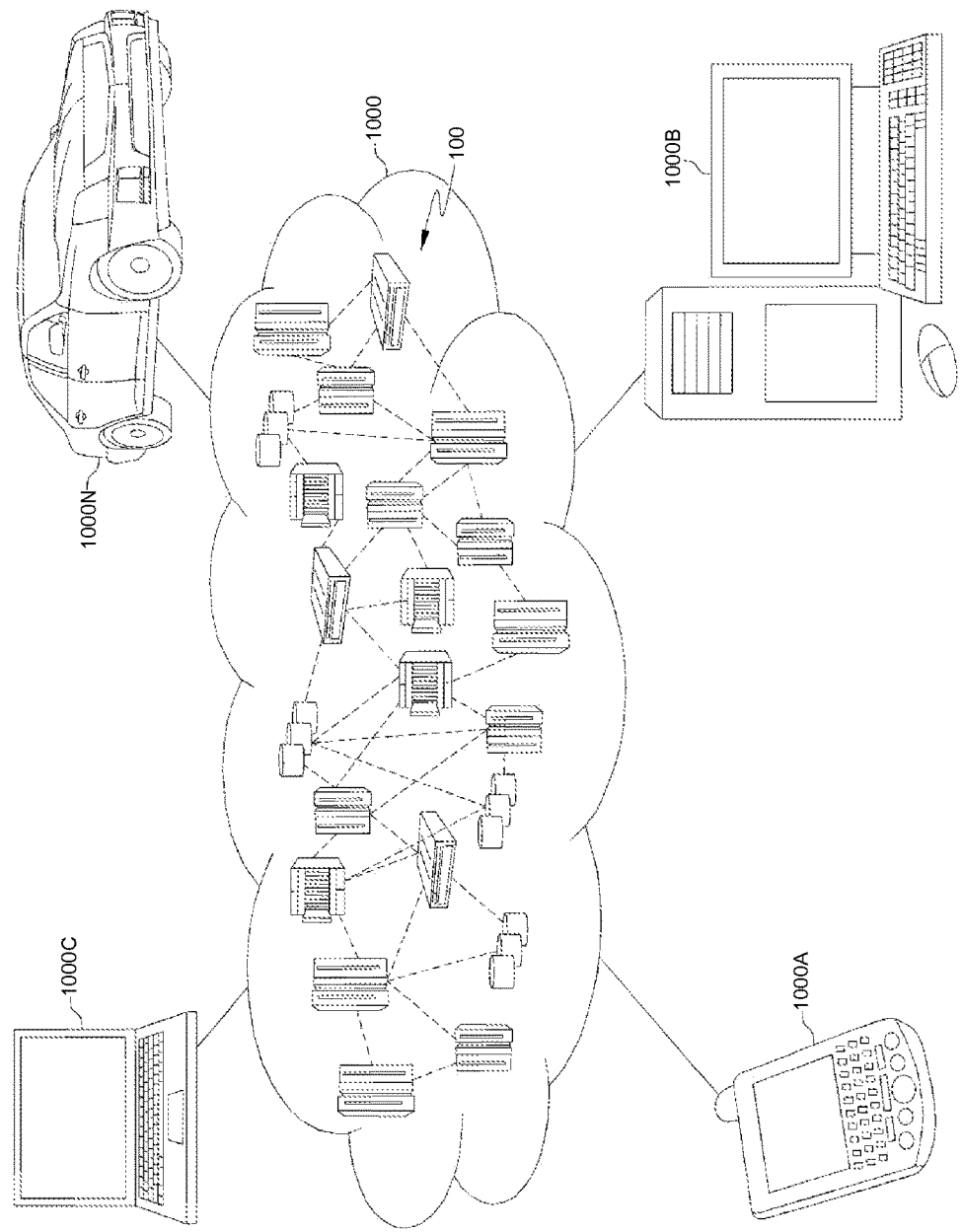
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
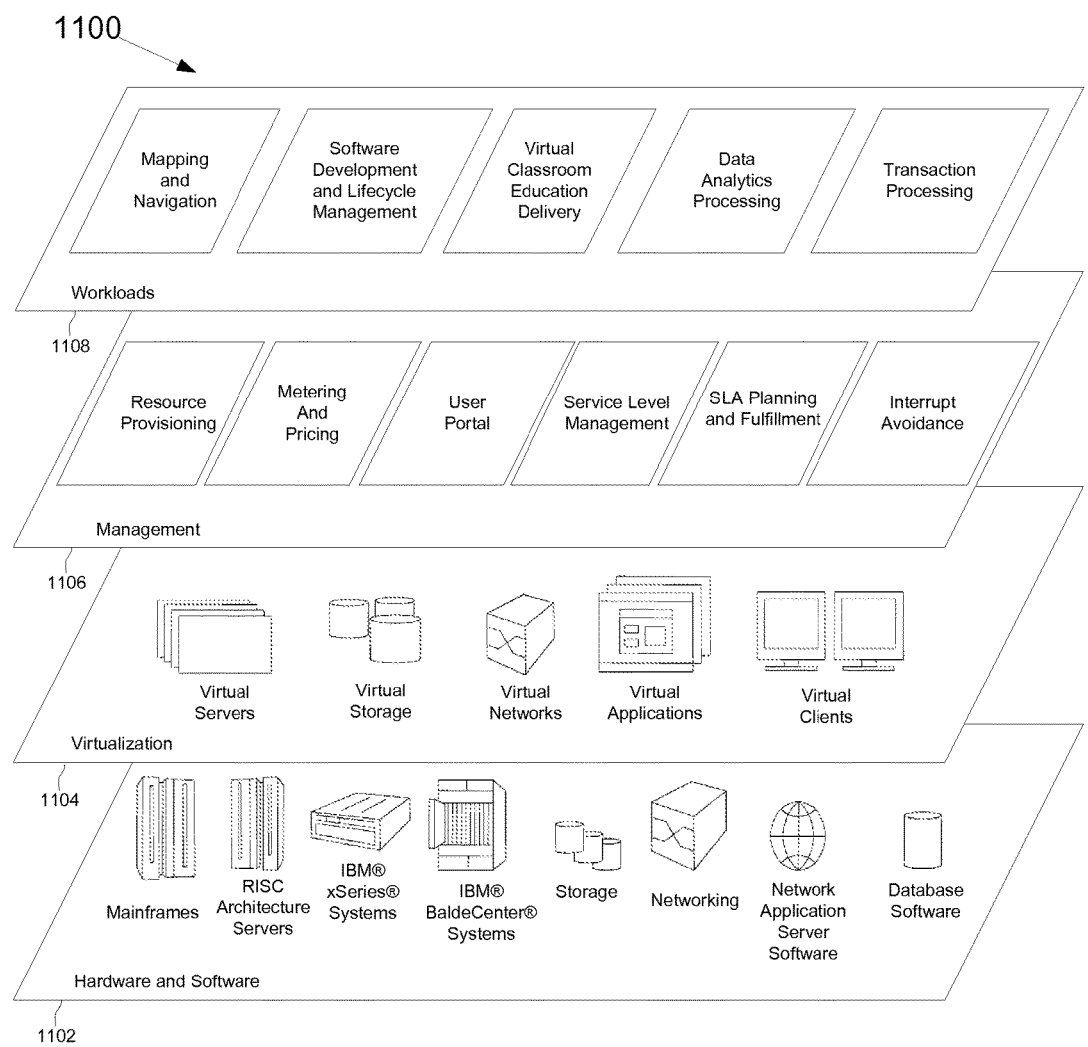
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA. Interrupt avoidance provides a way for software threads running on a CPU to avoid being blocked by external device interrupts.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for preventing a software thread from being blocked due to processing an external device interrupt, the method comprising:
   receiving the software thread, wherein the software thread has an associated interrupt avoidance variable;
   determining a processor to receive the software thread;
   sending the software thread to the determined processor;
   setting an interrupt mask bit associated with the determined processor based on the interrupt avoidance variable;
   receiving the external device interrupt;
   redirecting the received external device interrupt to a second processor, wherein the redirecting is based on the interrupt mask bit;
   determining if the software thread has relinquished execution, wherein determining if the software thread has relinquished execution comprises detecting at least one of a preemption event, an end of time slice event, and a thread sleep event;
   unsetting the interrupt mask bit based on determining that the software thread has relinquished execution; and
   undispatching the software thread.

2. The method of claim 1, wherein determining the processor to receive the software thread comprises determining if the processor is in an idle state.

3. The method of claim 2, wherein determining the processor is in the idle state comprises determining if the processor is in an interrupt processing mode.

4. The method of claim 1, wherein setting the interrupt mask bit comprises determining if a user associated with the software thread has a privilege level exceeding a threshold value.

5. The method of claim 1, wherein the interrupt mask bit comprises a hardware register.

* * * * *